(12) United States Patent
Ren et al.

(10) Patent No.: US 10,170,754 B2
(45) Date of Patent: Jan. 1, 2019

(54) SILICON MONOXIDE COMPOSITE NEGATIVE ELECTRODE MATERIAL USED FOR LITHIUM ION BATTERY, THE PREPARATION METHOD THEREOF AND A LITHIUM ION BATTERY

(71) Applicant: Shenzhen BTR New Energy Materials Inc., Shenzhen (CN)

(72) Inventors: Jianguo Ren, Shenzhen (CN); Dexin Yu, Shenzhen (CN); Min Yue, Shenzhen (CN)

(73) Assignee: Shenzhen BTR New Energy Materials Inc., Shenzhen (CN)

( * ) Notice: Subject to any disclaimer, the term of this patent is extended or adjusted under 35 U.S.C. 154(b) by 847 days.

(21) Appl. No.: 14/270,776

(22) Filed: May 6, 2014

(65) Prior Publication Data

US 2015/0099174 A1 Apr. 9, 2015

(30) Foreign Application Priority Data

Oct. 8, 2013 (CN) .......................... 2013 1 0467646

(51) Int. Cl.
| | |
|---|---|
| *H01M 4/36* | (2006.01) |
| *H01M 4/04* | (2006.01) |
| *H01M 4/1395* | (2010.01) |
| *H01M 4/136* | (2010.01) |
| *H01M 4/62* | (2006.01) |
| *H01M 4/38* | (2006.01) |
| *H01M 4/02* | (2006.01) |
| *H01M 4/48* | (2010.01) |
| *H01M 4/134* | (2010.01) |
| *H01M 10/0525* | (2010.01) |

(52) U.S. Cl.
CPC ......... *H01M 4/366* (2013.01); *H01M 4/0428* (2013.01); *H01M 4/0471* (2013.01); *H01M 4/134* (2013.01); *H01M 4/1395* (2013.01); *H01M 4/386* (2013.01); *H01M 4/483* (2013.01); *H01M 4/625* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2003/0118905 A1* | 6/2003 | Fukuoka | ............... | C09C 1/3045 429/218.1 |
| 2005/0136330 A1* | 6/2005 | Mao | ..................... | C25D 17/10 429/231.95 |
| 2008/0261116 A1* | 10/2008 | Burton | ................... | B82Y 10/00 429/231.8 |
| 2011/0287313 A1* | 11/2011 | Fukuoka | ................ | H01G 11/30 429/188 |
| 2013/0071752 A1* | 3/2013 | Kanno | .................. | C01B 33/021 429/231.8 |
| 2013/0344391 A1* | 12/2013 | Yushin | .................. | H01M 4/366 429/231.8 |

FOREIGN PATENT DOCUMENTS

| | | |
|---|---|---|
| CN | 101894939 | 11/2010 |
| CN | 102214817 | 10/2011 |
| CN | 103199252 | 7/2013 |
| JP | 2002042806 A | 2/2002 |
| JP | 2010272411 A | 12/2010 |
| JP | 2012134050 | 7/2012 |
| JP | 2013506233 A | 2/2013 |
| WO | 2011148569 A1 | 12/2011 |

OTHER PUBLICATIONS

Liu et al., Nano-Porous SiO/Carbon Composite Anode Material for Lithium-Ion Batteries, Journal of Applied Electrochemistry; 2009; pp. 1643-1649; vol. 39, Springer Science+Business Media B.V.*
Kim et al., Enhanced Cycle Performance of SiO—C Composite Anode for Lithium-Ion Batteries, Journal of Power Sources; Mar. 8, 2007; pp. 456-459; Elsevier B.V.; www.sciencedirect.com.*
Chang et al., "Quartz (SiO2): a new energy storage anode material for Li-ion batteries", Energy Environ. Sci., 2012, 5: 6895-6899.
Feng et al., "Facile approach to SiOx/Si/C composite anode material from bulk SiO for lithium ion batteries", Phys. Chem. Chem. Phys., 2013, 15: 14420-14426.
Seong et al., "Electrochemical behavior of a lithium-pre-doped carbon-coated silicon monoxide anode cell", Journal of Power Sources, 2009, 189: 511-514.
Yamamura et al., "Reduction effect of irreversible capacity on SiO anode material heat-reacted with Fe2O3", Journal of Power Sources, 2013, 232: 264-269.

* cited by examiner

*Primary Examiner* — Rena Dye Cronin
(74) *Attorney, Agent, or Firm* — Andrus Intellectual Property Law, LLP

(57) ABSTRACT

The present invention relates to a silicon monoxide composite negative electrode material, which comprises silicon monoxide substrate. Nano-Silicon material uniformly deposited on the silicon monoxide substrate and nanoscale conductive material coating layer on the surface of the silicon monoxide/Nano-Silicon. The preparation method of the silicon monoxide composite negative electrode material includes Nano-Silicon chemistry vapor deposition, nanoscale conductive material coating modification, screening and demagnetizing. The silicon monoxide composite negative electrode material has properties of high specific capacity (>1600 mAh/g), high charge-discharge efficiency of the first cycle (>80%) and high conductivity.

16 Claims, 4 Drawing Sheets

SILICON MONOXIDE COMPOSITE NEGATIVE ELECTRODE MATERIAL USED FOR LITHIUM ION BATTERY, THE PREPARATION METHOD THEREOF AND A LITHIUM ION BATTERY

CROSS-REFERENCE TO RELATED APPLICATION

This application is U.S. national stage application of Chinese Application No. 201310467646.6, filed Oct. 8, 2013, the contents of which is incorporated herein by reference in its entirety.

TECHNICAL FIELD

The present invention relates to lithium ion batten technical field, specifically relates to a silicon monoxide composite negative electrode material used for lithium ion battery, the preparation method thereof and lithium ion battery.

BACKGROUND ART

Lithium ion battery is an ideal power source for portable electronic equipment, electronic cars and energy storage systems. It is core matter in lithium ion battery research to develop new negative electrode material of high specific energy, good safety and low cost. The research of new electrode material is important for the research of new lithium ion battery. Now most full-blown negative electrode materials for lithium ion battery are graphite materials, of which the theory specific capacity is only 372 mAh/g, and thus the potential is limited and cannot meet the requirement of future lithium ion battery for the high energy density. Silicon monoxide material has higher theory specific capacity (>2000 mAh/g) and lower lithium storage reaction voltage platform, and its preparation cost is low. Therefore, silicon monoxide material becomes a kind of negative electrode material of great potential for replacing graphite. Nevertheless, Silicon monoxide has poor conductivity, and properties close to insulator, resulting in poor electrochemical reaction property. Also, $SiO_2$ included in the silicon monoxide material will be transformed to phases, such as $Li_4SiO_4$, $Li_2Si_2O_5$, during the Lithium intercalation reaction of the first cycle (Quartz ($SiO_2$): a new energy storage anode material for Li-ion batteries, Energy Environ. Sci., 2012, 5, 6895-6899). The reactions consume a large amount of Li-ion, which results in poor charge-discharge efficiency of the first cycle (<70%).

To improve the conductivity of the silicon monoxide material, skilled in the art will use organic carbon source, such as phenol-formaldehyde resin, epoxy resin, pitch, polyvinyl alcohol, polyvinyl chloride, polystyrene etc. for pyrolytic carbon coating. The conductivity and electrochemistry properties of the silicon monoxide material will be improved after the carbon coating. But the improvement of silicon monoxide property by hydrolytic carbon coating treatment is very limited, due to poor self-conductivity of the coating material pitch, resin or macromolecule material. Pre-lithiation is an effective method to improve the efficiency of charge-discharge efficiency of the first cycle. By pre-coating lithium powder on the surface of the silicon monoxide electrode, the efficiency of charge-discharge efficiency of the first cycle was improved from 67.7% to 72.8% in reference 1 (Electrochemical behavior of a lithium-pre-doped carbon-coated silicon monoxide anode cell, J. Power Sources, 2009, 189, 511-514); by sticking lithium foil onto the surface of the silicon monoxide electrode, applying voltage between the electrode and the lithium foil, and dipping them into electrolyte for 8 minutes, the efficiency of charge-discharge efficiency of the first cycle was improved from 61.9% to 94.4% in reference 2 (Facile approach to SiOx/Si/C composite anode material from bulk SiO for lithium ion batteries, Phys. Chem. Chem. Phys., 2013, 15, 14420-14426). The pre-lithiation needs to proceed in dry and anaerobic environment, is difficult to operate and is difficult to control with respect to the extent of pre-lithiation, so it is only used in laboratory and difficult to large-scale promotion now. By mixed heat treatment of silicon monoxide material and silicate coating $Fe_2SiO_4$ was uniformly formed on the surface of silicon monoxide, the efficiency of charge-discharge efficiency of the first cycle was improved from 70% to 90% in reference 3(Reduction effect of irreversible capacity on SiO anode material heat-reacted with $Fe_2O_3$, J. Power Sources, 2013, 232, 264-269). But it is possible that $Fe_2O_3$ reacts incompletely, also it is easy to form simple substance of Fe, thus the battery using the material has declined self-discharge and cycling performance.

Accordingly, development of a silicon monoxide negative electrode material with high conductivity, high efficiency of charge-discharge efficiency of the first cycle and good cycling stability is a difficult technical problem in the lithium ion battery field.

SUMMARY OF THE INVENTION

To overcome one or more disadvantages of prior art, the first object of the invention is to provide a silicon monoxide composite negative electrode material, which can improve the conductivity, specific capacity, the efficiency of charge-discharge efficiency of the first cycle and cycling stability of the silicon monoxide negative electrode material.

The silicon monoxide composite negative electrode material comprises silicon monoxide substrate, Nano-Silicon material uniformly deposited on the silicon monoxide substrate and nanoscale conductive material coating layer on the surface of the silicon monoxide/Nano-Silicon.

Preferably the silicon monoxide composite negative electrode material consists of silicon monoxide substrate, Nano-Silicon material uniformly deposited on the silicon monoxide substrate and nanoscale conductive material coating layer on the surface of the silicon monoxide/Nano-Silicon.

Preferably, the silicon monoxide composite negative electrode material comprises silicon monoxide substrate, carbon material coating layer on the surface of the substrate, Nano-Silicon material uniformly deposited on the carbon material coating layer and nanoscale conductive material coating layer on the surface of the silicon monoxide/carbon material coating layer/Nano-Silicon.

Preferably, the silicon monoxide composite negative electrode material consists of silicon monoxide substrate, carbon material coating layer on the surface of the substrate, Nano-Silicon material uniformly deposited on the carbon material coating layer and nanoscale conductive material coating layer on the surface of the silicon monoxide/carbon material coating layer/Nano-Silicon.

Preferably, the nanoscale conductive material coating layer comprises one material selected from the group consisting of carbon nanotubes, graphene, conductive graphite, carbon fiber, Nano-graphite and conductive carbon black, or combination thereof.

Preferably, the content of the nanoscale conductive material coating layer in the negative electrode material is 0.1-10.0 wt %, more preferably 0.5-8.0 wt %, particularly preferably 1.0-7.0 wt %.

Preferably, the silicon monoxide substrate is silicon monoxide particles with molecular formula of $SiO_x$, wherein $0.5 \leq x \leq 1.5$; the average particle size is 0.1-30.0 μm, and $D_{max} \leq 50.0$ μm; the content of magnetic material is below 50.0 ppm; the content of metal impurity is below 50.0 ppm; the specific surface area is 0.1-20.0 m²/g; the $SiO_x$ comprises monocrystalline and/or polycrystalline silicon particles of 0.1-20.0 nm.

Preferably, the Nano-Silicon material is mono-dispersed Nano-Silicon particles with average particle size of 1.0-1000.0 nm, the Nano-Silicon particle is crystal and/or amorphous.

Preferably, the Nano-Silicon material is continuous Nano-Silicon film, and its thickness is 1.0-1000.0 nm, for example, 2.0 nm, 3.0 nm, 5.0 nm, 10.0 nm, 15.0 nm, 20.0 nm, 30.0 nm, 50.0 nm, 100.0 nm, 150.0 nm, 200.0 nm, 300.0 nm, 400.0 nm, 500.0 nm, 800.0 nm, 900.0 nm, 950.0 nm, 980.0 nm, 990.0 nm, 995.0 nm, 998.0 nm, 999.0 nm, etc.; the Nano-Silicon film is crystal and/or amorphous.

Preferably, the content of the Nano-Silicon material in the silicon monoxide composite negative electrode material is 0.1-50.0 wt %, more preferable 0.5-40.0 wt %, particularly preferably 1.0-30.0 wt %.

Preferably, the carbon material coating layer is obtained through being coated by one material selected from the group consisting of pitch, macromolecule material and polymer or mixture thereof and then being treated at high temperature; particularly preferably, the carbon material coating layer is obtained through being coated by one material selected from the group consisting of coal pitch, petroleum pitch, mesophase pitch, macromolecule material and polymer or mixture thereof and then being treated at high temperature. The high temperature refers to a temperature at which pitch, macromolecule material or polymer is cracked into carbon material. In the present invention, the high temperature refers to 500.0-1300.0° C.

The second object of the invention is to provide a lithium ion battery, which comprises the silicon monoxide composite negative electrode material provided by the present invention.

The third object of the invention is to provide a preparation method of the silicon monoxide composite negative electrode material, which comprises the steps of:

(1) Nano-Silicon chemistry vapour deposition is executed on the surface of silicon monoxide particles with silicon resource;

(2) the material obtained through the step (1) is subjected to nanoscale conductive material coating modification;

(3) the material obtained through the step (2) is subjected to screening and demagnetizing.

Preferably, the preparation method of the silicon monoxide composite negative electrode material comprises the steps of:

(1') silicon monoxide particles are subjected to carbon material coating modification following carbonization treatment, obtaining carbon material coating layer of amorphous structure;

(1) Nano-Silicon chemistry vapour deposition is executed on the surface of the material obtained through the step (1') with silicon resource;

(2) the material obtained through the step (1) is subjected to nanoscale conductive material coating modification;

(3) the step (2) is subjected to screening and demagnetizing.

Preferably, the silicon source in the step (1) is one selected from the group consisting of $SiH_4$, $Si_2H_6$, $Si_3H_8$, $SiCl_4$, $SiHCl_3$, $Si_2Cl_6$, $SiH_2Cl_2$ and $SiH_3Cl$, or combination thereof.

Preferably, the temperature of the chemistry vapour deposition in the step (1) is between 500.0 and 1300.0° C., such as 510° C., 520° C., 530° C., 550° C., 600° C., 650° C., 700° C., 800° C. 900° C., 1000° C., 1100° C., 1150° C., 1200° C., 1250° C., 1580° C., 1290° C., 1295° C. etc.

Preferably, the coating modification in the step (2) employs one of mechanical modification, nano-dispersion and liquid phase coating; preferably, the equipment of the mechanical modification is ball mill or fusion machine.

Preferably, in the demagnetizing in the step (2), the magnetic field strength is between 3000.0 and 30000.0 Gs, the treatment temperature is between 10.0 and 80.0° C., and the treatment period is between 10.0 and 120.0 s.

Preferably, the coating modification in the step (1') employs one of solid phase coating, liquid phase coating, and gas phase coating.

Preferably, the carbonization treatment temperature in the step (1') is between 500.0 and 1300.0° C., such as 510° C., 520° C., 530° C., 550° C., 600° C., 650° C., 700° C., 800° C., 900° C., 1000° C., 1100° C., 1150° C., 1200° C., 1250° C., 1580° C., 1290° C., 1295° C. etc.

In the present invention, the term "silicon monoxide/nano-silicon" means a composite material consisting of silicon monoxide substrate and Nano-Silicon material deposited on the silicon monoxide substrate. The term "silicon monoxide/carbon material coating layer/nano-silicon" means a composite material consisting of silicon monoxide substrate, carbon material coating layer on the surface of the substrate and Nano-Silicon material deposited on the carbon material coating layer.

Because Nano-Silicon has higher lithium storage capacity and charge-discharge efficiency than silicon monoxide, the present invention can improve the specific capacity and the charge-discharge efficiency of the first cycle of silicon monoxide material compared with prior art by uniformly depositing Nano-Silicon material on the surface of silicon monoxide or carbon-coated silicon monoxide material. By using chemistry vapour deposition, uniformly dispersed Nano-Silicon particles or continuous Nano-Silicon film can form in situ on the surface of silicon monoxide or carbon-coated silicon monoxide material, which could avoid forming secondary agglomeration of the Nano-Silicon material. By coating nanoscale conductive material on the surface of silicon monoxide/Nano-Silicon composite material, the contact of the conductive material with the composite material can be enhanced and the conductive ability of the composite materials can be improved. By using mechanical modification, nano-dispersion or liquid phase coating, the nanoscale conductive material can be advantageously uniformly dispersed on the surface of the composite material, which could avoid agglomeration of the nanoscale conductive material. The silicon monoxide composite negative electrode material of the invention has properties of high specific capacity (>1600 mAh/g), high charge-discharge efficiency of the first cycle (>80%) and high conductivity. The method of the invention is simple, easy to operate, economic, and suitable for industrial production.

DETAILED DESCRIPTION OF THE INVENTION

In order to facilitate understanding of the present invention, the examples of the present invention are exemplified as follows. The skilled person in the art should understand that, the examples are merely to help the understanding of the invention and should not be considered as specific limitation on the present invention.

Example 1

Ball milling 500 g SiO particles with a purity of 99.99%, to an extent of average particle size $D_{50}$=5.1 μm and $D_{max}$=50.0 μm, then put them into a pipe furnace. Under the protection of highly pure nitrogen at flow rate of 4.0 L/min, raise the temperature to 1000.0° C. in 5° C./min. Then substitute the highly pure nitrogen with a mixture gas of highly pure hydrogen and SiHCl3, keeping the flow rate at 4.0 L/min. After maintain the temperature constant for 1.0 h, substitute the mixture gas with highly pure nitrogen, naturally cooling down to room temperature to get silicon monoxide/Nano-silicon composite material with a deposit amount of 10.0%. Mix the composite material and conductive carbon black Super-P uniformly in a mass ratio of 95.0:5.0 by mechanical ball milling. After screening and demagnetizing, the end product silicon monoxide composite negative electrode material was obtained.

Figure 1:
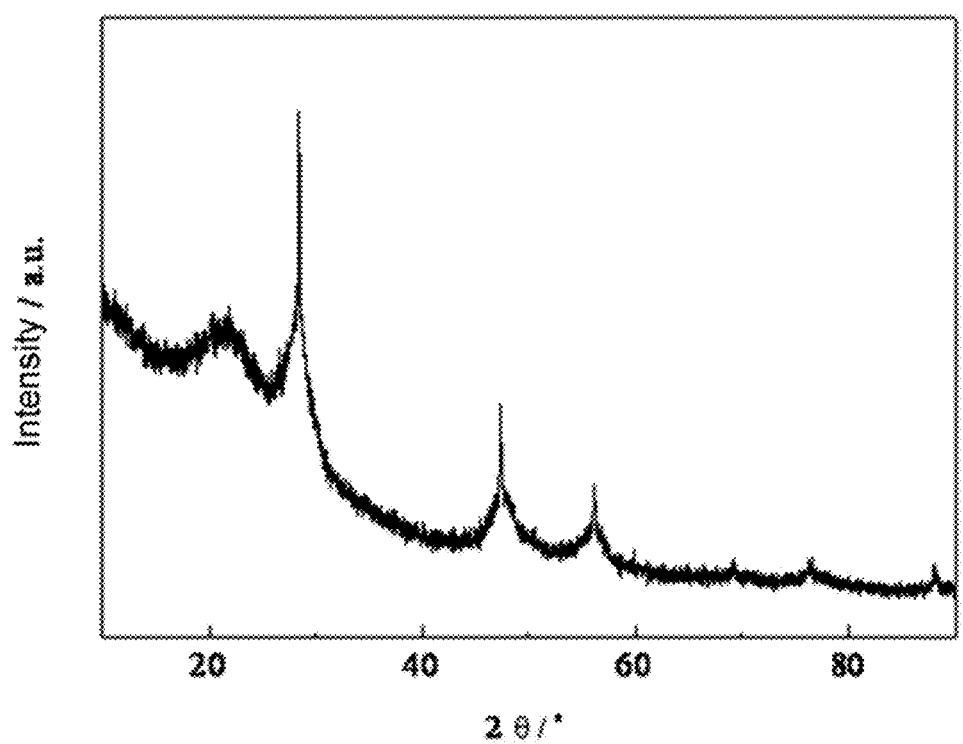
FIG. 1 shows the x-ray diffraction profile of the silicon monoxide composite negative electrode material obtained in Example 1.
Figure 2:
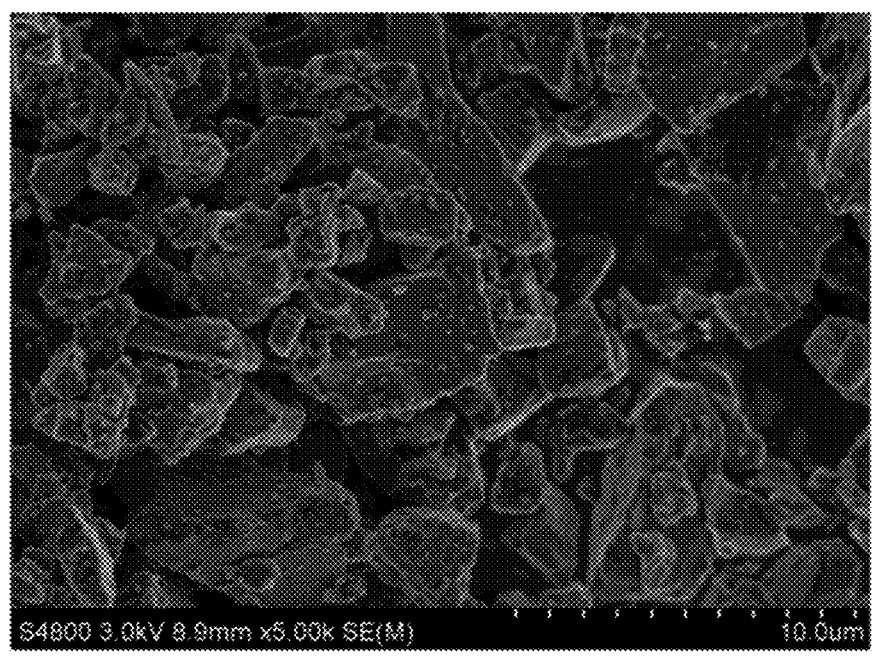
FIG. 2 shows the scanning electron micrograph of the silicon monoxide composite negative electrode material obtained in Example 1.
Figure 3:
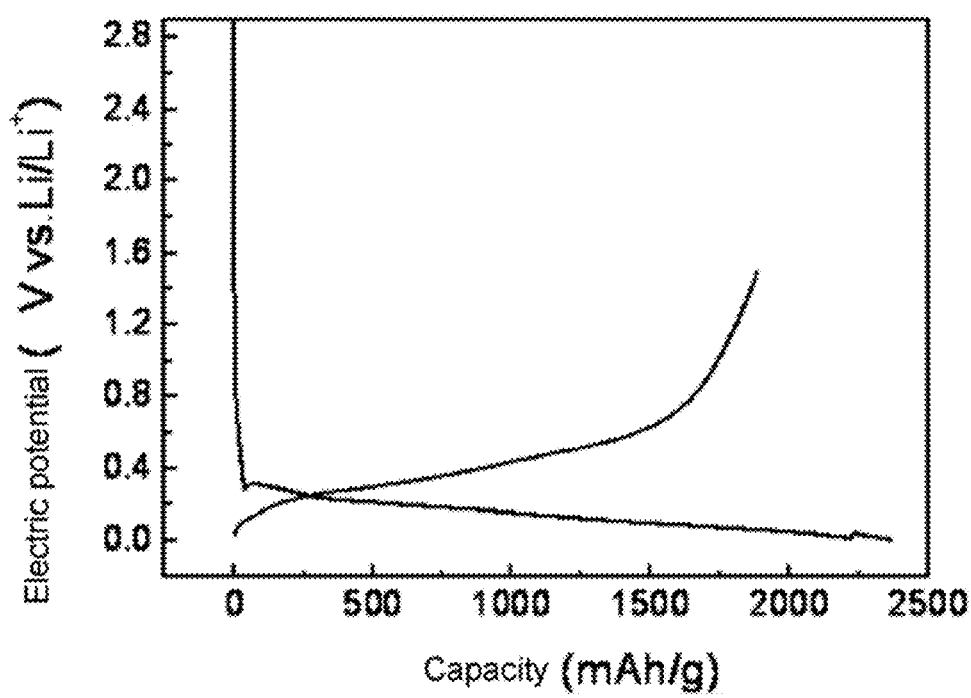
FIG. 3 shows the charge-discharge curve of the first cycle for the silicon monoxide composite negative electrode material obtained in Example 1.
Figure 4:
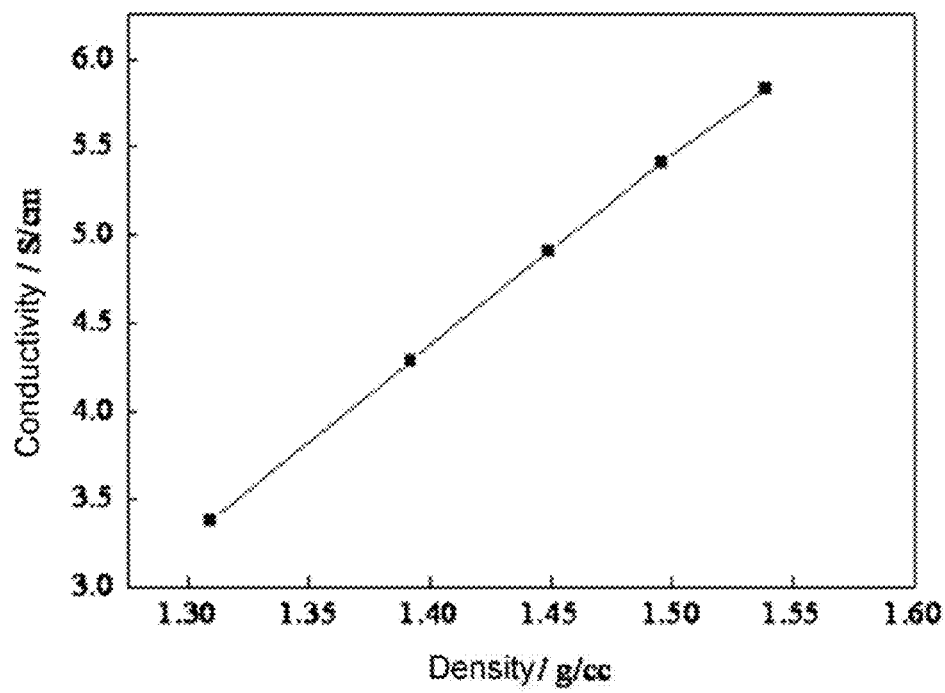
FIG. 4 shows the conductivity of the silicon monoxide composite negative electrode material obtained in Example 1.

FIG. 1 shows the x-ray diffraction profiles of the silicon monoxide composite negative electrode material, wherein the diffraction peaks centred at 28.6°, 47.5°, 56.3° corresponds to crystalline planes of crystalline silicon (111), (220), (311) respectively, which means the negative electrode material contains nano crystalline silicon obtained by chemical vapor deposition. FIG. 2 shows the scanning electron micrographs of the negative electrode material obtained in Example 1, wherein the mean particle size is 6.3 μm, and there is a layer of Nano-conductive agent uniformly coated on the surface of the negative electrode material. FIG. 3 shows the charge-discharge curve of the first cycle of the negative electrode material obtained in Example 1, wherein the discharge (lithiation) specific capacity of the material is 2339.7 mAh/g, the charge (delithiation) specific capacity of the material is 1885.8 mAh/g, and the efficiency of charge-discharge efficiency of the first cycle is 80.6%. FIG. 4 shows the conductivity of the negative electrode material obtained in Example 1, Compared with the SiO raw material, the conductivity of the negative electrode material was improved by 12 magnitudes, i.e. from $10^{-12}$ S/cm to $10^{0}$S/cm, which shows the good conductivity of the negative material.

Example 2

Jet milling 1 kg SiO particles with a purity of 99.99%, to an extent of average particle size $D_{50}$=2.0 μm and $D_{max}$=25.4 μm. Disperse 100 g petroleum pitch and SiO into tetrahydrofuran solution, carry out spray drying, and then execute carbonization treatment at 900° C. under the protection of nitrogen. Cool the reaction product to room temperature, obtaining SiO materials with carbon materials coating outside. Put the SiO materials with carbon materials coating outside into a carrier oven. Under the protection of highly pure nitrogen at flow rate of 5.0 L/min, raise the temperature to 500° C. in 5° C./min. Then substitute the highly pure nitrogen with a mixture gas of highly pure hydrogen and $SiH_4$, keeping the flow rate at 5.0 L/min. After maintain the temperature constant for 5.0 h, substitute the mixture gas with highly pure nitrogen, naturally cooling down to room temperature to get silicon monoxide/carbon material coating layer/Nano-silicon composite material with a silicon deposit amount of 12.0%. Mix the composite material and graphene uniformly in a mass ratio of 99.9:0.1 by mechanical integration. After screening and demagnetizing, the end product silicon monoxide composite negative electrode material was obtained.

Figure 5:
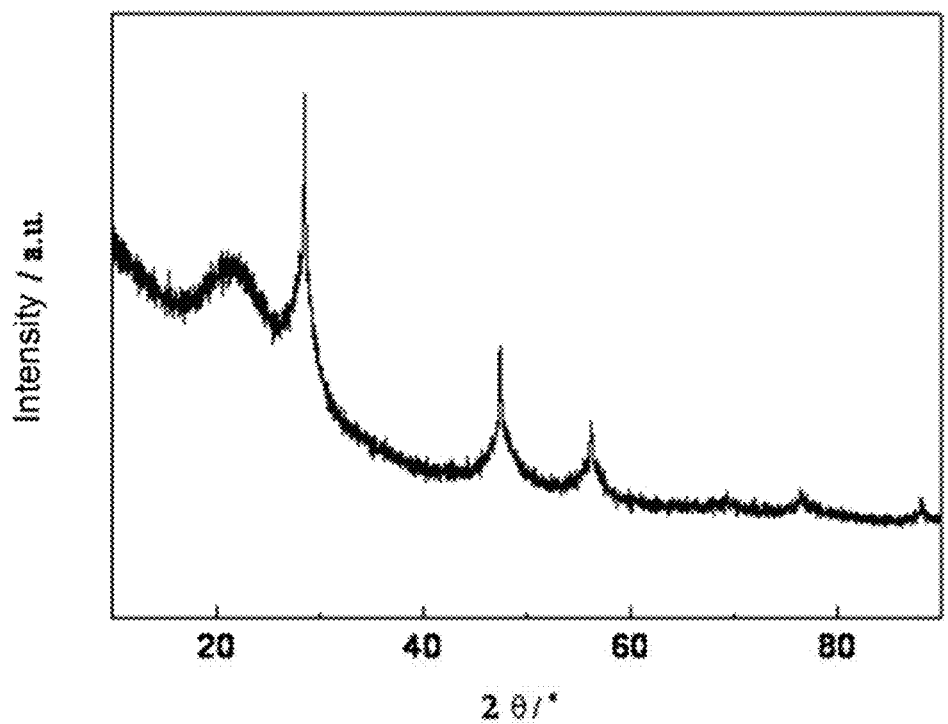
FIG. 5 shows the x-ray diffraction profile of the silicon monoxide composite negative electrode material obtained in Example 2.
Figure 6:
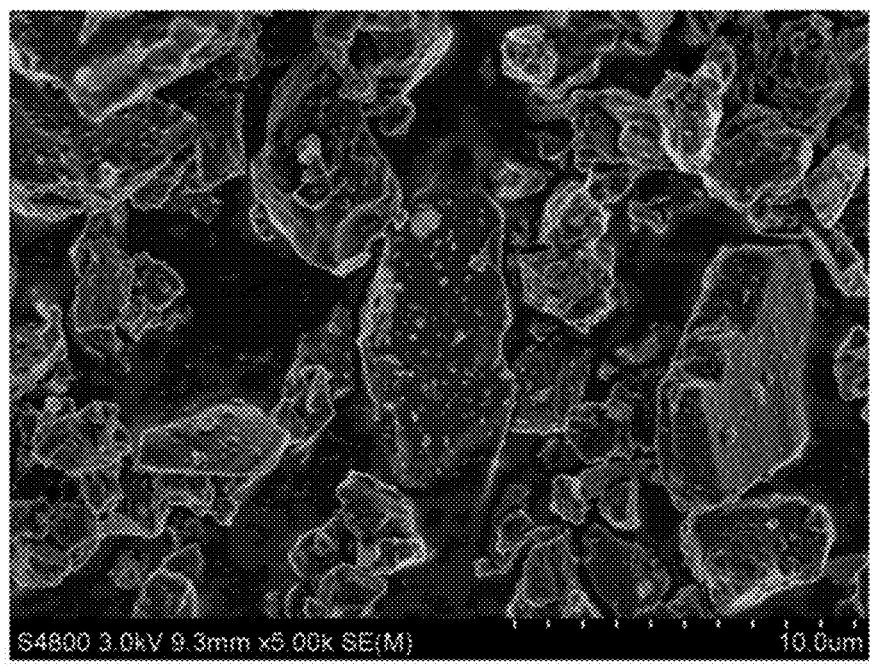
FIG. 6 shows the scanning electron micrograph of the silicon monoxide composite negative electrode material obtained in Example 2.
Figure 7:
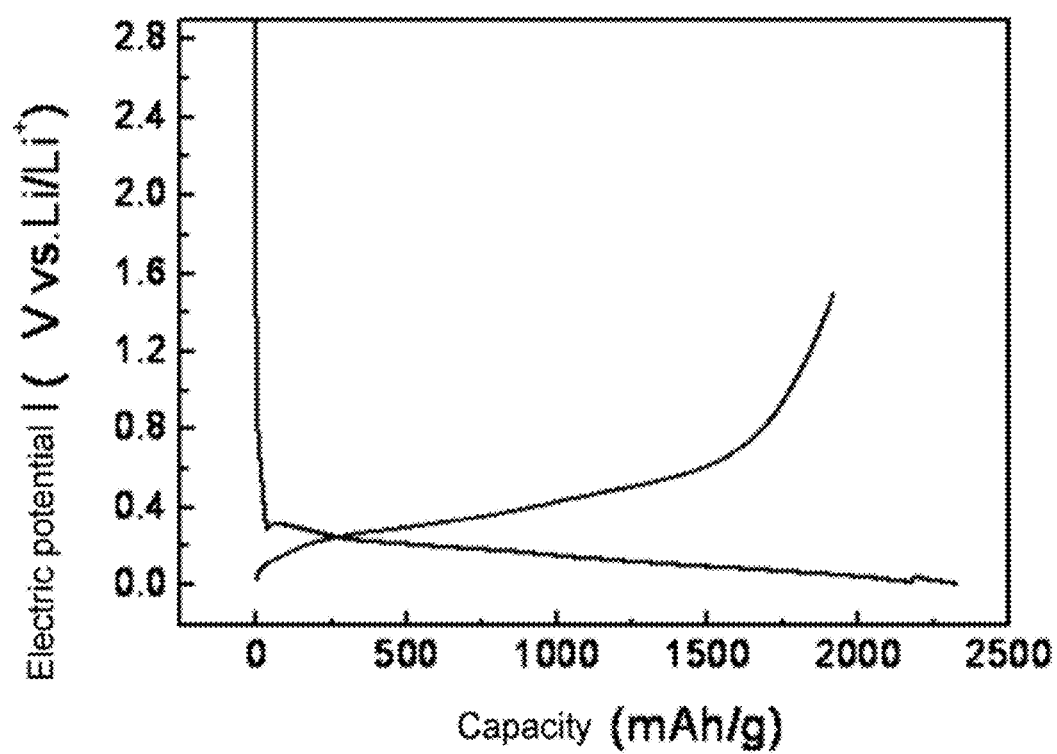
FIG. 7 shows the charge-discharge curve of the first cycle for the silicon monoxide composite negative electrode material obtained in Example 2.

FIG. 5 shows the x-ray diffraction profiles of the silicon monoxide composite negative electrode material obtained in Example 2, wherein the diffraction peaks centred at 28.6°, 47.5°, 56.3° corresponds to crystalline planes of crystalline silicon (111), (220) and (311) respectively, which means the negative electrode material contains nano crystalline silicon obtained by chemical vapor deposition. FIG. 6 shows the scanning electron micrographs of the negative electrode material obtained in Example 2, where the mean particle size is 5.8 μm, and there is a layer of Nano-conductive agent uniformly coated on the surface of the negative electrode material. FIG. 7 shows the charge-discharge curve of the first cycle of the negative electrode material obtained in Example 2, wherein the discharge (lithiation) specific capacity of the material is 2321.8 mAh/g, the charge (delithiation) specific capacity of the material is 1918.3 mAh/g, and the efficiency of charge-discharge efficiency of the first cycle is 82.6%.

Example 3

Ball milling 500 g SiO0.5 particles with a purity of 99.99%, to an extent of average particle size $D_{50}$=0.1 μm and $D_{max}$=2.0 μm, then put them into a pipe furnace. Under the protection of highly pure nitrogen at flow rate of 2.5 L/min, raise temperature to 500.0° C., in 5.0° C./min. Then substitute highly pure nitrogen with a mixture gas of highly pure hydrogen and $SiH_4$, keeping the flow rate at 2.5 L/min. After maintain the temperature constant for 15.0 hr, substitute the mixture gas with highly pure nitrogen, naturally cooling down to room temperature to get silicon monoxide/Nano-silicon composite material with a deposit amount of 7.0%. Mix the composite material and carbon nanotubes uniformly in a mass ratio of 90.0:10.0 by nano-dispersion. After screening and demagnetizing, the end product silicon monoxide composite negative electrode material was obtained.

Example 4

Ball milling 1 kg SiO particles with a purity 99.99%, to an extent of average particle size $D_{50}$=30.0 μm and $D_{max}$=50.0 µm, then put them into a pipe furnace. Under the protection of highly pure nitrogen at flow rate of 4.5 L/min, raise temperature to 1300.0° C. in 3.0° C./min. Then substitute the highly pure nitrogen with a mixture gas of highly pure hydrogen and $Si_3H_8$, keeping the flow rate at 4.5 L/min. After maintaining the temperature constant for 0.5 hr, substitute the mixture gas with highly pure nitrogen, naturally cooling down to room temperature to get silicon monoxide/Nano-silicon composite material with a deposit amount of 0.1%. Mix the composite material and grapheme uniformly in a mass ratio of 99.0:1.0 by mechanical fusion. After screening and demagnetizing, the end product silicon monoxide composite negative electrode material was obtained.

Example 5

Jet milling 1 kg $SiO_{0.5}$ particles with a purity 99.99%, to an extent of average particle size $D_{50}$=0.1 µm and $D_{max}$=3.2 µm. Disperse 200 g citric acid and SiO into alcoholic solution, carry out spray drying, and then execute carbonization treatment under the protection of nitrogen at 500° C. Cool the reaction product to room temperature, obtaining SiO materials with carbon materials coating outside. Put the SiO materials with carbon materials coating outside into a carrier oven. Under the protection of highly pure nitrogen at flow rate of 5.0 L/min, heat at rate of raise temperature to 1300° C. in 5° C./min. Then substitute the highly pure nitrogen with a mixture gas of highly pure hydrogen and $SiH_3Cl$, keeping the flow rate at 5.0 L/min. After maintaining the temperature constant for 5.0 hr, substitute the mixture gas with highly pure nitrogen, naturally cooling down to room temperature to get silicon monoxide/carbon material coating layer/nano-silicon composite material with a silicon deposit amount of 6.0%. Mix the composite material and conductive graphite uniformly in a mass ratio of 94.0:6.0 by mechanical integration. After screening and demagnetizing, the end product silicon monoxide composite negative electrode material was obtained.

Example 6

Jet milling 1 kg $SiO_{1.5}$ particles with a purity 99.99%, to an extent of average particle size $D_{50}$=30.0 µm and $D_{max}$=50.0 µm. Disperse 200 g phenol-formaldehyde resin and SiO into alcoholic solution, carry out spray drying, and then execute carbonization under the protection of nitrogen at 1300° C. Cool the reaction product to room temperature, obtaining SiO materials with carbon materials coating outside. Put the SiO materials with carbon materials coating outside into a carrier oven. Under the protection of highly pure nitrogen at flow rate of 3.5 L/min, raise temperature to 500° C. in 2.0° C./min. Then substitute the highly pure nitrogen with a mixture gas of highly pure hydrogen and $SiH_4$, keeping the flow rate at 3.5 L/min. After maintaining the temperature constant for 12.0 hr, substitute the mixture gas with highly pure nitrogen, naturally cooling down to room temperature to get silicon monoxide/carbon material coating layer/nano-silicon composite material with a silicon deposit amount of 50.0%. Mix the composite material and conductive carbon black Super-P in a mass ratio of 98.0:2.0 by mechanical integration. After screening and demagnetizing, the end product silicon monoxide composite negative electrode material was obtained.

Comparative Example 1

Jet milling 1 kg SiO particles with a purity 99.99%, to an extent of average particle size $D_{50}$=2.0 µm and $D_{max}$=25.4 µm. Disperse 100 g petroleum pitch and SiO into tetrahydrofuran solution, carry out spray drying, and then execute carbonization treatment under the protection of nitrogen at 900° C. Cool the reaction product to room temperature, obtaining SiO materials with carbon materials coating outside.

The electrochemical test results for the negative electrode material prepared in Example 1-6 and Comparative Example 1 are as shown in Table 1.

TABLE 1

|  | $1^{st}$ Reversible Capacity (mAh/g) | First Coulombic Efficiency (%) | Conductivity ($10^{-2}$ S/cm) |
|---|---|---|---|
| Example 1 | 1885.8 | 80.6 | 541 |
| Example 2 | 1918.3 | 82.6 | 1010 |
| Example 3 | 2080.1 | 82.1 | 821 |
| Example 4 | 1600.5 | 75.3 | 327 |
| Example 5 | 2105.4 | 82.7 | 116 |
| Example 6 | 2249.7. | 80.9 | 692 |
| Comparative Example 1 | 1420.9 | 71.5 | 0.835 |

Note:
The conductivity was measured at a compacted density of 1.5 g/cc.

The applicant state that, by the above examples the detailed process equipment and process of the invention will be described, but the invention is not limited to the above detailed process equipment and process. That is to say, the present invention does not rely on the above detailed process equipment and process to implement. Those skilled in the art should know that, the modifications or equivalent alterations of the raw materials of the present productions, addition of auxiliary materials or the selection of specific methods and so on shall all fall into the protective scope of the present invention.

The invention claimed is:

1. A silicon monoxide composite negative electrode material, which comprises, from inside to outside, a silicon monoxide substrate, a carbon material coating layer on the surface of the substrate, a crystalline nano-silicon material uniformly deposited on the carbon material coating layer and a nanoscale conductive material coating layer on the surface of the silicon monoxide substrate/carbon material coating layer/crystalline nano-silicon material, wherein the crystalline nano-silicon material is mono-dispersed nano-silicon particles with an average particle size of 1.0-1000.0 nm.

2. A silicon monoxide composite negative electrode material according to claim 1, wherein the nanoscale conductive material coating layer comprises one material selected from the group consisting of carbon nanotubes, graphene, conductive graphite, carbon fiber, nano-graphite, conductive carbon black, and combinations thereof.

3. A silicon monoxide composite negative electrode material according to claim 2, wherein the content of the nanoscale conductive material coating layer in the negative electrode material is 0.1-10.0 wt %.

4. A silicon monoxide composite negative electrode material according to claim 2, wherein, the silicon monoxide substrate is silicon monoxide particles, and its molecular formula is $SiO_x$, wherein $0.5 \leq x \leq 1.5$; the average particle size is 0.1-30.0 µm, and Dmax≤50.0 µm; the content of magnetic material is below 50.0 ppm; the content of metal impurity is below 50.0 ppm; the specific surface area is 0.1-20.0 m²/g; the $SiO_x$ comprises monocrystalline and/or polycrystalline silicon particles of 0.1-20.0 nm.

5. A silicon monoxide composite negative electrode material according to claim 1, wherein, the carbon material coating layer is obtained through being coated by one material selected from the group consisting of pitch, macromolecule material, and polymer, and mixtures thereof of at least two above-mentioned materials and then being treated at high temperature.

6. A silicon monoxide composite negative electrode material according to claim 5, wherein the carbon material coating layer is obtained through being coated by one material selected from the group consisting of coal pitch, petroleum pitch, mesophase pitch, macromolecule material, polymer, and mixtures thereof.

7. A silicon monoxide composite negative electrode material according to claim 1, wherein silicon deposit amount in the silicon monoxide substrate/carbon material coating layer/crystalline nano-silicon material is 7.0-50.0%.

8. A silicon monoxide composite negative electrode material according to claim 1, wherein silicon deposit amount in the silicon monoxide substrate/carbon material coating layer/crystalline nano-silicon material is 12.0-50.0%.

9. A silicon monoxide composite negative electrode material according to claim 1, wherein silicon deposit amount in the silicon monoxide substrate/carbon material coating layer/crystalline nano-silicon material is 12.0%.

10. A lithium ion battery, which comprises the silicon monoxide composite negative electrode material according to claim 1.

11. A preparation method of the silicon monoxide composite negative electrode material according to claim 1, which comprises the steps of:

(1') silicon monoxide particles are subjected to carbon material coating modification following carbonization treatment, obtaining carbon material coating layer of amorphous structure;
(1) nano-silicon chemistry vapour deposition is executed on the surface of the material obtained through the step (1') with the silicon resource;
(2) the material obtained by the step (1) is subjected to nanoscale conductive material coating modification; and
(3) the material obtained by the step (2) is subjected to screening and demagnetizing.

12. The method according to claim 11, wherein the silicon source in the step (1) is one selected from the group consisting of $SiH_4$, $Si_2H_6$, $Si_3H_8$, $SiCl_4$, $SiHCl_3$, $Si_2Cl_6$, $SiH_2Cl_2$, $SiH_3Cl$, and combinations thereof.

13. The method according to claim 12, wherein the temperature of the chemistry vapour deposition in the step (1) is 500.0-1300.0° C.

14. The method according to claim 12, wherein the coating modification in the step (2) employs one of mechanical modification, nano-dispersion or liquid phase coating.

15. The method according to claim 12, wherein in the demagnetizing in the step (3), magnetic field strength is 3000.0-30000.0 Gs, treatment temperature is 10.0-80.0° C., and treatment period is 10.0-120.0 s.

16. The method according to claim 11, wherein the coating modification in step (1') employs one of solid phase coating, liquid phase coating or gas phase coating; temperature of the carbonization treatment in the step (1') is 500.0-1300.0° C.

* * * * *